US010389655B2

(12) United States Patent
Janardhanan

(10) Patent No.: US 10,389,655 B2
(45) Date of Patent: Aug. 20, 2019

(54) EVENT-BASED PACKET MIRRORING

(71) Applicant: DELL PRODUCTS L.P., Round Rock, TX (US)

(72) Inventor: Pathangi Janardhanan, Santa Clara, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 361 days.

(21) Appl. No.: 14/493,155

(22) Filed: Sep. 22, 2014

(65) Prior Publication Data

US 2016/0087916 A1 Mar. 24, 2016

(51) Int. Cl.
*H04L 12/931* (2013.01)
*H04L 29/06* (2006.01)
*H04L 29/08* (2006.01)

(52) U.S. Cl.
CPC ........ *H04L 49/208* (2013.01); *H04L 63/1408* (2013.01); *H04L 67/1095* (2013.01); *H04L 69/22* (2013.01); *H04L 63/306* (2013.01)

(58) Field of Classification Search
CPC . H04L 63/1408; H04L 67/1095; H04L 69/22; H04L 49/208; H04L 63/306
See application file for complete search history.

(56) References Cited

U.S. PATENT DOCUMENTS 6,707,817 B1 * 3/2004 Kadambi .............. H04L 69/161 370/235
9,742,705 B2 * 8/2017 Eardley ................... H04L 49/90
2007/0208838 A1 * 9/2007 Balasubramaniam Chandra ........ H04L 63/1433 709/223
2011/0170552 A1 * 7/2011 Suzuki ................ H04L 49/9078 370/401

* cited by examiner

*Primary Examiner* — Noel R Beharry
*Assistant Examiner* — Ruihua Zhang
(74) *Attorney, Agent, or Firm* — North Weber & Baugh LLP

(57) ABSTRACT

Embodiments of the present invention include systems and methods for minoring data packets upon triggering of events in a network device. In the network device, a usage event is specified, where occurrence of the usage event is indeterminable, at least partially, from the information contained in the data packets. When the network device receives a data packet via an input port, it processes the data packet as the data packet flows along a pipeline in the network device. If a specified usage event is triggered while being processed, the data packet is mirrored via an output port of the network device so that the mirrored data packet may be analyzed by an analysis engine.

17 Claims, 4 Drawing Sheets

EVENT-BASED PACKET MIRRORING

TECHNICAL FIELD

The present invention relates to monitoring network traffic flow, more particularly, to systems and methods for event-based mirroring of data packets.

DESCRIPTION OF THE RELATED ART

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As the value and use of information continues to increase, individuals and businesses seek additional ways to monitor network traffic. One conventional way to monitor packets flowing through a network device is port minoring. Port minoring is used on a network device, such as switch, to send a copy of network packets seen on one switch port to a network monitoring connection on another switch port. This is commonly used for network appliances that require monitoring of network traffic such as an intrusion detection system, passive probe or real user monitoring (RUM) technology that is used to support application performance management (APM).

Another conventional way to monitor packets flowing through a network device is sampled flow, or shortly sFlow. sFlow uses sampling to achieve scalability and is, for this reason, applicable to high speed networks. An sFlow system may sample one packet per a fixed number of incoming packets. Alternatively, the sFlow system may read the header information of each incoming packet and check if the header information has matching parameters specified in a table, such as ACL table. Then, the sFlow system may sample one packet per a fixed number of incoming packets that have matching parameters, make a copy of the sampled packet and send the copy to a network monitoring connection on another switch port.

FIG. 1 shows a schematic diagram of a conventional switch 100, where the switch 100 can perform port minoring and sFlow. For brevity, only one ingress port 102 and two egress ports 104 and 106 are shown in FIG. 1. As depicted, the processor 107 may make a copy of each packet received through the ingress port 102 and send the copy to an analysis engine 120 through the egress port 106. Alternatively, the packet passes through a proper pipeline 108 for various operations, such as reading the header information of the packet and queuing packets in a buffer 114. A counter 112 may count the number of incoming packets, sample one packet per a fixed number of incoming packets and send a copy of the sampled packet to the egress port 106. Optionally, the processor 107 may check if the header information of each incoming packet has matching parameters specified in a table 110, such as access control list (ACL) table, and sample one packet per a fixed number of packets that have the matching parameters, and send a copy of the sampled packet to the egress port 106.

There can be a lot of interest in terms of analytics on the switch 100, and the areas of interest include, for instance, dropping, buffering, congestion and causes for these phenomena. The existing minoring techniques are not suitable for analysis of such phenomena since the existing mirroring techniques sample packets based on the two parameters; (1) the identify of the ingress (or egress) port and (2) the header information of packets. Since the sampling is not associated with such phenomena, the packets sampled by the existing mirroring techniques cannot provide any meaningful information on the phenomena in the switch 100. As such, there is a need for monitoring techniques that can sample packets based on the event of interest occurring in a network device.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or nodes. Components may be implemented in software, hardware, or a combination thereof.

Furthermore, connections between components within the figures are not intended to be limited to direct connections. Rather, data between these components may be modified, re-formatted, or otherwise changed by intermediary components or devices. Also, additional or fewer connections may be used. It shall also be noted that the terms "coupled" "connected" or "communicatively coupled" shall be understood to include direct connections, indirect connections through one or more intermediary devices, and wireless connections.

Furthermore, one skilled in the art shall recognize: (1) that certain steps may optionally be performed; (2) that steps may not be limited to the specific order set forth herein; and (3) that certain steps may be performed in different orders, including being done contemporaneously.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

Figure 1:
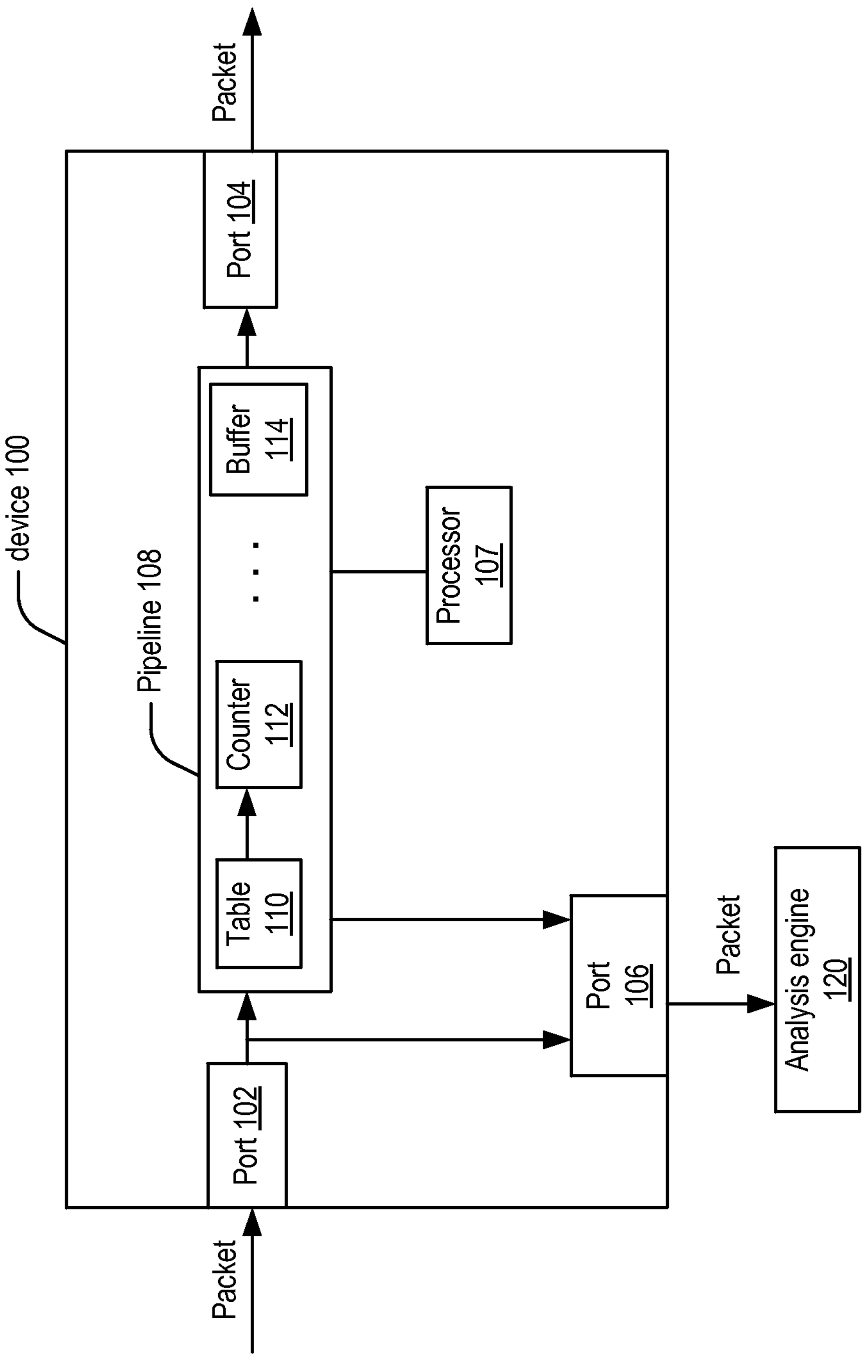
FIG. 1 shows a schematic diagram of a conventional switch that can perform port minoring and sFlow.
Figure 2:
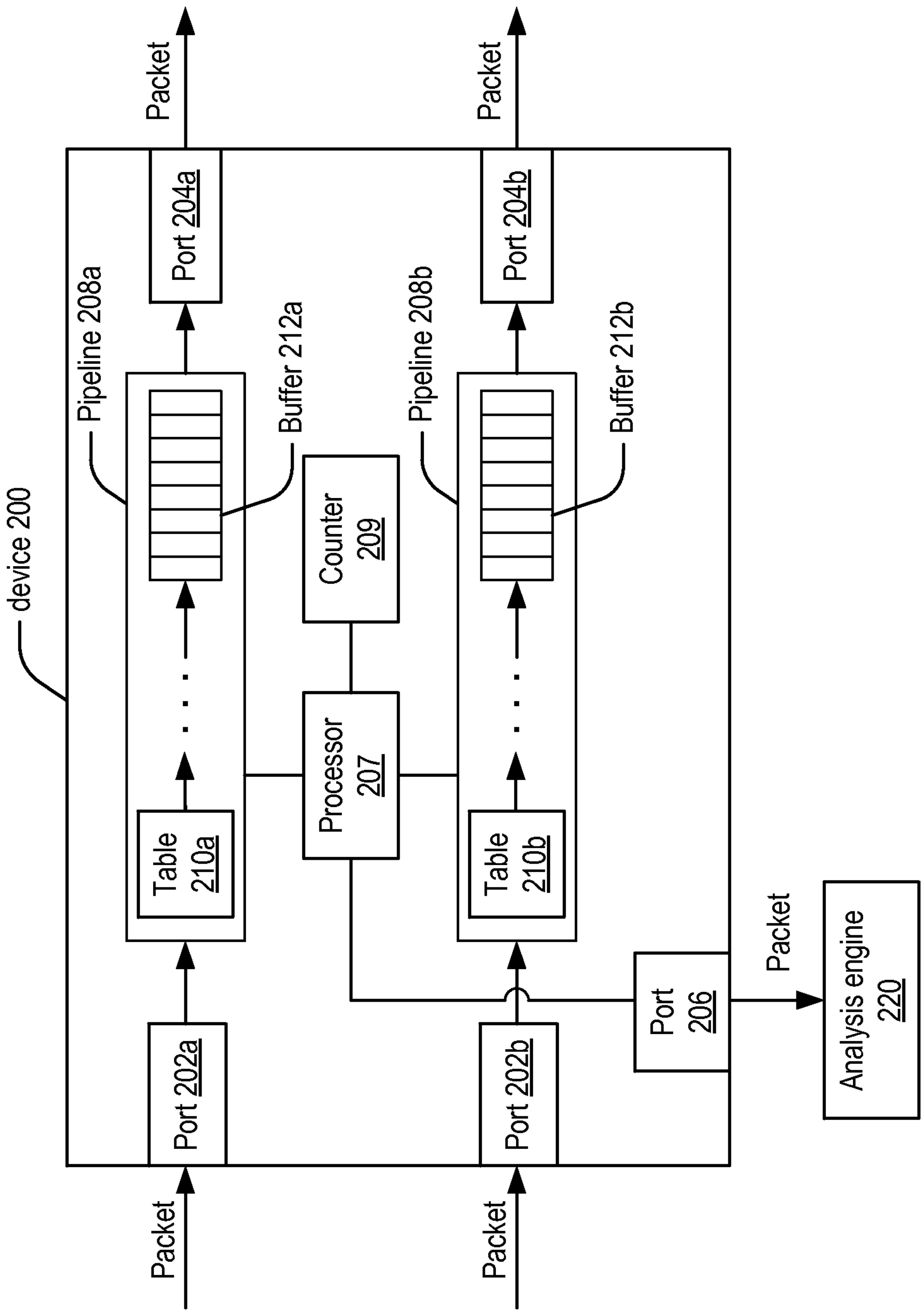
FIG. 2 shows a schematic diagram of a network device according to embodiments of the present invention.

FIG. 2 shows a schematic diagram of a network device 200 according to embodiments of the present invention. For brevity, one processor 207, two ingress ports 202*a* and 202*b* and three egress ports 204*a*, 204*b*, and 206 are shown in FIG. 2. However, it should be apparent to those of ordinary skill in the art that other suitable number of processors and ports may be implemented in the device 200. Also, for brevity, only one counter 209 is shown in FIG. 2, even though multiple counters may be implemented in the device 200. In embodiments, the components in the device 200 may be implemented in different configurations. For example, the tables 210*a* and 210*b* may be combined into one table and the buffers 212*a* and 212*b* may share one global buffer space.

In embodiments, a user may specify mirroring of packets based on events within the device 200. For instance, as depicted, the data packet received through the port 202*a* may pass through a pipeline 208*a* for data processing, such as buffering. When the egress queue in the buffer 212*a* is beyond a preset queue length (or, equivalently, marking threshold), i.e., the packets are placed beyond the preset queue length in the buffer 212*a*, the processor 207 may mark the packets beyond the marking threshold, make copies of the marked packets and send them to the analysis engine 220 via the port 206. Then, the analysis engine 220 may analyze the packets for various purposes so that the network engineer/administrator can monitor and analyze network performance and get warning when problems occur or predict issues.

In embodiments, the processor 207 may forward the dropped packets to the port 206. The packet received through the port 202*a* may be dropped by several reasons. For instance, the egress queue in the buffer 212*a* may not have enough space and hence a packet may be dropped. In another example, the drop may occur because the buffer 212*a* may not be available for the port/queue combination. In yet another example, the drop may occur due to the global buffer depletion. In still another example, the drop may occur when the size of the packet is bigger than the egress interface maximum transfer unit (MTU), or the egress port 204*a* is not a member of the virtual local area network (VLAN) that the packet belongs to. In embodiments, when the packet is dropped and forwarded to the analysis engine 220, the analysis engine 220 may analyze the packets for various purposes.

It is noted that the conventional mirroring techniques sample packets based on the identity of ingress (or egress) port and the header information of packets; and thus, they cannot predict whether each packet will be dropped or not in the pipeline 208. Unlike the conventional minoring devices, in embodiments, the device 200 allows the network engineer to specify a stage in the pipeline 208 where an event of interest occurs, to thereby understand the problems associated with the event. Stated differently, in embodiments, the device 200 is not, at least no solely, using the explicit parameters of the incoming packets, such as source identification (SID), destination ID, etc.; rather, one or more internal processing conditions are used by the device to identify data traffic for minoring, i.e., it monitors the transitory occurrence of an event or events in the process flow in the device.

In embodiments, the processor 207 may mark the packets when the packets experience congestion and send the marked packets to the analysis engine 220. For instance, an explicit congestion notification (ECN) bit of a packet may be marked in case of packet congestion. By analyzing the marked packets, the network engineer may know which type of packets are congested and find out which applications are causing the congestion so that a proper measures can be taken to prevent the congestion.

Some information of egress queue in the buffer 212*a*, congestion, and dropping may be inferred by enabling quantized congestion notification (QCN). By trapping QCN to the processor, the network engineer may get some idea of the packets that are being queued up in the congested state. However, this approach is not reliable and has its own issues in terms of the amount of QCN messages that are generated. In embodiments, the device 200 may send only a first few bytes of each mirrored packet along with some detailed header so that analytics of the buffering, utilization and congestion, and data flow related to congestion time can yield valuable information of the network traffic.

In embodiments, the processor 207 may mirror a packet when the parameters of the packet match a set of rules specified in the table 210*a*. (In FIG. 2, only one table is shown in the pipeline 208*a*, while other suitable number of tables may be implemented in the device 200.) in embodiments, each packet may be marked before mirrored out to the port 206. By specifying the rules for the event to trigger mirroring and analyzing the packets received via the port 206, the network engineer can monitor the number of packets that satisfy the rules in the table 21.0*a*, In embodiments, the set of rules in a table 210*b* may be different from those in the table 210*a* so that different types of packets are mirrored out.

In embodiments, the device 200 may perform the port minoring and sFlow. For instance, the counter 209 may count the number of packets received through each egress port and minor out one packet per a preset number of packets. In embodiments, the counter 209 may be also used to collect the statistics on the dropped, congested, or queued packets and report the collected information to the analysis engine 220.

In embodiments, the pipeline 208*b* for the packets received through the port 202*b* may be similar to the pipeline 208*a*, i.e., the functions of the table 210*b* and buffer 212*b* may be similar to those of the table 210*a* and 212*a*, respectively. In embodiments, the pipeline 208*a* may have different components than the pipeline 208*b* so that different types of events may be associated with the mirrored packets.

Figure 3A:
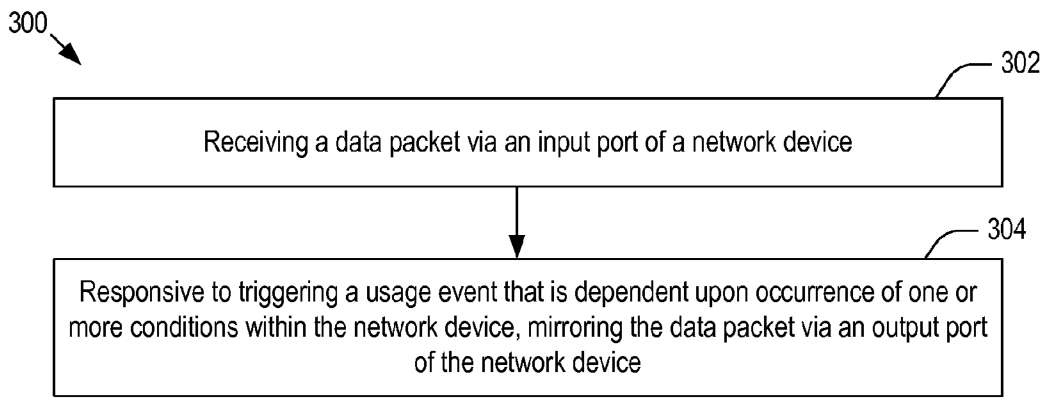
FIGS. 3A and 3B show flowcharts of illustrative processes for minoring a data packet according to embodiments of the present invention.

FIG. 3A shows a flowchart of an illustrative process for mirroring a data packet according to embodiments of the present invention. A user specifies a usage event in the device 200, where occurrence/triggering of the usage event (or, shortly event) is indeterminable from information (such as the header information) contained in the data packet; instead, the usage event is dependent upon occurrence of one or more conditions within the device. In embodiments, the event may include: placing the data packet beyond a preset length (or, equivalently threshold) in an egress queue of the buffer 212*a* in the device; dropping the data packet by the device; and congestion of the data packet while processing the data packet in the device.

In FIG. 3A, the process begins at step 302. At step 302, the device 200 receives a data packet via an input port 202*a*. Then, at step 304, the device 200 minors the data packet if the event is triggered, where the event is dependent upon occurrence of one or more conditions within the device 200, minoring the data packet via an output port of the network device. The mirrored data packet is sent to an analysis engine 220 for further analysis of the data packet. In embodiments, the mirrored data packet may be marked to indicate the usage event.

Figure 3B:
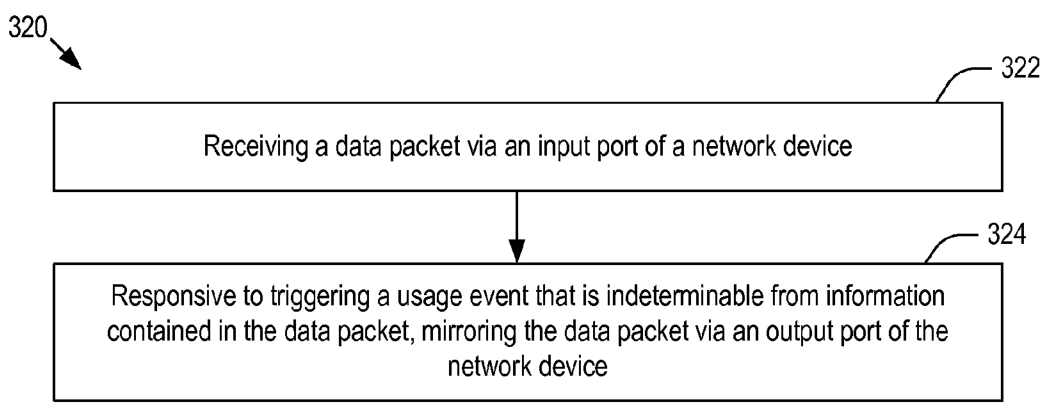

FIG. 3B shows a flowchart of an illustrative process for mirroring a data packet according to embodiments of the present invention. As in FIG. 3A, a user specifies a usage event in the device 200, where occurrence/triggering of the usage event (or, shortly event) is indeterminable from information (such as the header information) contained in the data packet; instead, the usage event is dependent upon occurrence of one or more conditions within the device. In embodiments, the event may include: placing the data packet beyond a preset length (or, equivalently threshold) in an egress queue of the buffer 212*a* in the device; dropping the data packet by the device; and congestion of the data packet while processing the data packet in the device.

In FIG. 3B, the process begins at step 322. At step 322, the device 200 receives a data packet via an input port 202*a*. Then, at step 324, the device 200 minors the data packet if the event is triggered, where the event is indeterminable from information contained in the data packet. The mirrored data packet is sent to an analysis engine 220 for further analysis of the data packet. In embodiments, the mirrored data packet may be marked to indicate the usage event.

For purposes of this disclosure, an information handling system may include any instrumentality or aggregate of instrumentalities operable to compute, calculate, determine, classify, process, transmit, receive, retrieve, originate, switch, route, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 4:
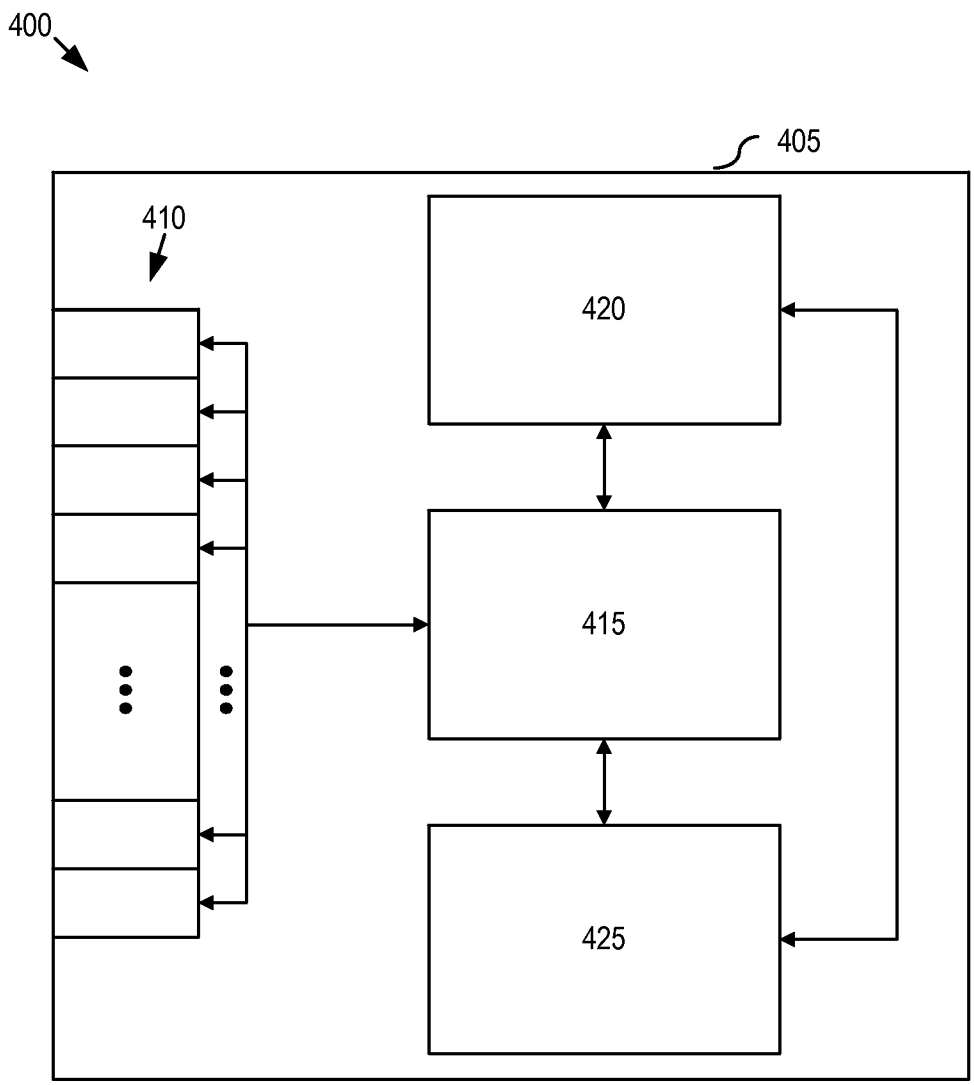
FIG. 4 shows an information handling system according to embodiments of the present invention.

FIG. 4 depicts a simplified block diagram of an information handling system 400 according to embodiments of the present invention. It will be understood that the functionalities shown for device 405 may operate to support various embodiments of an information handling system (or node)—although it shall be understood that an information handling system may be differently configured and include different components. The device 405 may include a plurality of I/O ports 410, a network processing unit (NPU) 415, one or more tables 420, and a central processing unit (CPU) 425. The system includes a power supply (not shown) and may also include other components, which are not shown for sake of simplicity.

In embodiments, the I/O ports 410 may be connected via one or more cables to one or more other network devices or clients. The network processing unit (NPU) 415 may use information included in the network data received at the device 405, as well as information stored in the tables 420, to identify a next hop for the network data, among other possible activities. In embodiments, a switching fabric then schedules the network data for propagation through the device to an egress port for transmission to the next hop.

It shall be noted that aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A method for minoring a data packet, the method comprising:

receiving a data packet via a first port of a network device;

responsive to one or more usage events from among a plurality of potential usage events, in which each usage event is dependent upon one or more states of one or more conditions of the network device existing when the data packet is being handled by the network device, mirroring the data packet via a second port of the network device; and marking the mirrored data packet to identify the one or more usage events from among the plurality of potential usage events, which existed in the network device when the data packet was being handled by the network device and which resulted in the data packet being mirrored by the network device, to facilitate analysis of performance of the network device using at least the one or more usage events identified by the marking in the mirrored data packet.

2. A method as recited in claim 1, wherein the usage event includes placing the data packet beyond a threshold in an egress queue of a buffer in the network device.

3. A method as recited in claim 1, wherein the usage event includes dropping the data packet by the network device.

4. A method as recited in claim 1, wherein the usage event includes congestion at an egress of the data packets during processing in the network device.

5. A non-transitory tangible computer-readable medium comprising a set of instructions for performing the method of claim 1.

6. A method for mirroring a data packet, the method comprising:

receiving a data packet via a first port of a network device;

responsive to one or more usage events from among a plurality of potential usage events, in which each usage event relates to one or more states of one or more conditions of the network device existing when the data packet is being handled by the network device and that is indeterminable from information contained in the data packet, mirroring the data packet via a second port of the network device; and marking the mirrored data packet to identify the one or more usage events from among the plurality of potential usage events, which existed in the network device when the data packet was being handled by the network device and which resulted in the data packet being mirrored by the network device, to facilitate analysis of performance of the network device using at least the one or more usage events identified by the marking in the mirrored data packet.

7. A method as recited in claim 6, wherein the usage event includes placing the data packet beyond a threshold in an egress queue of a buffer in the network device.

8. A method as recited in claim 6, wherein the usage event includes dropping the data packet by the network device.

9. A method as recited in claim 6, wherein the usage event includes congestion at an egress queue of data packets during processing in the network device.

10. A method as recited in claim 6, wherein the usage event includes matching a set of rules specified in a table in the network device.

11. A method as recited in claim 6, wherein the usage event is dependent upon occurrence of one or more conditions within the network device.

12. A non-transitory tangible computer-readable medium comprising a set of instructions for performing the method of claim 6.

13. An information handling system for mirroring a data packet, comprising:

a plurality of ports, at least one of the plurality of ports being configured to data;

one or more processors that are communicatively coupled to the plurality of I/O ports; and a memory that is communicatively coupled to the one or more processors and stores one or more sequences of instructions, which when executed by one or more processors causes steps to be performed comprising:

receiving a data packet via a first port of a network device;

responsive to one or more usage events from among a plurality of potential usage events, in which each usage event is dependent upon one or more states of one or more conditions of the network device existing when the data packet is being handled by the network device, mirroring the data packet via a second port of the network device; and marking the mirrored data packet to identify the one or more usage events from among the plurality of potential usage events, which existed in the network device when the data packet was being handled by the network device and which resulted in the data packet being mirrored by the network device, to facilitate analysis of performance of the network device using at least the one or more usage events identified by the marking in the mirrored data packet.

14. An information handling system as recited in claim 13, further comprising:

a buffer for holding an egress queue and wherein the usage event includes placing the data packet beyond a threshold in the egress queue.

15. An information handling system as recited in claim 13, wherein the usage event includes the data packet being dropped by the information handling system.

16. An information handling system as recited in claim 13, wherein the usage event includes congestion at an egress queue of data packet during processing by the information handling system.

17. An information handling system as recited in claim 13, further comprising:

an analysis engine for analyzing the data packet received from the second port.

* * * * *